United States Patent
Suzuki et al.

(10) Patent No.: US 7,546,469 B2
(45) Date of Patent: Jun. 9, 2009

(54) IMAGE FORMING APPARATUS, METHOD FOR CONTROLLING WRITING DATA FROM THE SAME TO STORAGE DEVICE, METHOD FOR CONTROLLING READING DATA FROM STORAGE DEVICE TO THE SAME, AND REPLACEMENT PART THEREFOR

(75) Inventors: Kenji Suzuki, Ebina (JP); Tomohiro Ono, Ebina (JP); Takanori Masui, Ebina (JP); Tomohisa Suzuki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 801 days.

(21) Appl. No.: 10/883,657

(22) Filed: Jul. 6, 2004

(65) Prior Publication Data

US 2005/0108559 A1    May 19, 2005

(30) Foreign Application Priority Data

Nov. 19, 2003    (JP)    ............................. 2003-389741

(51) Int. Cl.
*H04L 9/00* (2006.01)

(52) U.S. Cl. ........................................ 713/176; 371/37

(58) Field of Classification Search .................. 713/176
See application file for complete search history.

(56) References Cited

U.S. PATENT DOCUMENTS

| | | | | |
|---|---|---|---|---|
| 4,502,082 | A | * | 2/1985 | Ragle et al. .................... 360/76 |
| 4,785,451 | A | * | 11/1988 | Sako et al. ................... 714/756 |
| 4,972,474 | A | * | 11/1990 | Sabin .......................... 380/28 |
| 5,086,362 | A | * | 2/1992 | Maurice ...................... 360/121 |
| 5,303,393 | A | * | 4/1994 | Noreen et al. .............. 455/3.02 |
| 5,325,342 | A | * | 6/1994 | Vo-Dinh .................. 369/13.01 |
| 5,537,945 | A | * | 7/1996 | Sugihara et al. ........ 112/470.06 |
| 5,661,799 | A | * | 8/1997 | Nagel et al. .................... 705/52 |
| 2001/0013944 | A1 | * | 8/2001 | Nagasawa et al. .......... 358/1.14 |
| 2003/0206635 | A1 | * | 11/2003 | Morley et al. ................ 380/269 |
| 2005/0120260 | A1 | * | 6/2005 | Suzuki et al. ................... 714/5 |
| 2006/0200260 | A1 | * | 9/2006 | Hoffberg et al. .............. 700/86 |

\* cited by examiner

*Primary Examiner*—Kambiz Zand
*Assistant Examiner*—Dant B Shaifer Harriman
(74) *Attorney, Agent, or Firm*—Morgan, Lewis & Bockius LLP

(57) ABSTRACT

An image forming apparatus has a replacement part equipped with a storage device installed therein. The apparatus has a code adding part adding an error detecting code to target data to be written in the storage device, and an encrypting part encrypting the data having the error detecting code added thereto in the code adding part, to generate encrypted data. In addition, the apparatus has a writing part writing the encrypted data to the storage device.

8 Claims, 10 Drawing Sheets

IMAGE FORMING APPARATUS, METHOD FOR CONTROLLING WRITING DATA FROM THE SAME TO STORAGE DEVICE, METHOD FOR CONTROLLING READING DATA FROM STORAGE DEVICE TO THE SAME, AND REPLACEMENT PART THEREFOR

BACKGROUND OF THE INVENTION

1. Field of the Invention

The present invention relates to an image forming apparatus, and more particularly, it relates to write-in and readout of data with respect to a memory unit of a replacement part detachably installed in an image forming apparatus.

2. Description of the Related Art

Some kinds of an image forming apparatus, such as a printer, a duplicator, a digital composite machine and a facsimile machine, have a replacement part detachably installed therein, examples of which include a toner cartridge and a photoreceptor drum cartridge. It has been practiced that the replacement part is provided with a nonvolatile storage medium, which stores management data, such as an enumeration data indicating a consumed amount of the replacement part (such as a number of sheets consumed for printing) and user information, and the management data stored in the nonvolatile storage medium is read out from and written in the image forming apparatus main body.

In the case where the stored contents of the nonvolatile storage medium of the replacement part are falsified, such a problem occurs that, for example, a replacement part having been deteriorated in quality due to excessive use beyond the prescribed service life is utilized by installing in an image forming apparatus. In such a case, not only printouts with high quality cannot be provided, but also there is such a possibility that the image forming apparatus itself is damaged. Consequently, it is necessary to detect falsification of the data stored in the storage medium of the replacement part.

JP-A-2001-209580 discloses a technique for detecting falsification, in which an authentication process is executed upon reading and writing data on the storage part to prevent the data from being read out and written in by a false third party. In this technique, furthermore, after writing the data, an encrypting process is executed based on the written data, and the result of the encrypting process is verified to validate the written data.

JP-A-11-53487 discloses a technique for improving fastness to breakage and falsification, in which same data are written in plural locations of an embedded memory of an IC card, and upon readout, the data stored in the plural locations are read out to determine the correct data by majority decision.

However, in the case where the technique disclosed in JP-A-2001-209580 is applied to a storage device of a replacement part of an image forming apparatus, it is necessary to provide a mechanism for the authentication process in the storage device, which raises the production cost. In the technique disclosed in JP-A-11-53487, the correct data is determined by majority decision of the data stored in the plural locations in the memory, and therefore, it has such a problem that in the case where false data is written in majority of the locations, the false data is judged as correct data to overlook falsification.

SUMMARY OF THE INVENTION

The invention has been made in view of the aforementioned circumstances and is to solve at least one of the problems associated with the related art.

According to a first aspect of the invention, an image forming apparatus having a replacement part equipped with a storage device installed therein is provided, and the apparatus has a code adding part adding an error detecting code to target data to be written in the storage device; an encrypting part encrypting the data having the error detecting code added thereto in the code adding part, to generate encrypted data; and a writing part writing the encrypted data to the storage device.

According to a second aspect of the invention, an image forming apparatus having a replacement part equipped with a storage device installed therein is provided, and the apparatus has a reading part reading encrypted data stored in the storage device; a decrypting part decrypting the encrypted data thus read by the reading part, to reproduce target data having an error detecting code; and an error detecting part detecting an error in the target data having an error detecting code thus reproduced in the decrypting part, by using the error detecting code.

In an embodiment of the invention, the image forming apparatus further has a read controlling part making the reading part read out the encrypted data from plural storage regions corresponding to the target data, making the decrypting part decrypt plural pieces of encrypted data thus read out, and making the error detecting part detect an error in the plural pieces of data thus decrypted; a restoration processing part, in a case where an error is detected by the error detecting part in only one of the plural pieces of decrypted data, restoring the storage region storing encrypted data corresponding to the data having an error thus detected by writing therein encrypted data produced based on the data having no error detected; and an error processing part, in a case where an error is detected by the error detecting part in two or more of the plural pieces of decrypted data, executing a prescribed error process.

According to a third aspect of the invention, in an image forming apparatus having a replacement part equipped with a storage device installed therein, a method for controlling writing data from the image forming apparatus to the storage device is provided, and the method has steps of: adding an error detecting code to target data to target data to be written in the storage device; encrypting the data having the error detecting code added thereto to generate encrypted data; and writing the encrypted data to the storage device.

According to a fourth aspect of the invention, in an image forming apparatus having a replacement part equipped with a storage device installed therein, a method for controlling reading data from the storage device to the image forming apparatus is provided, and the method has steps of: reading encrypted data stored in the storage device; decrypting the encrypted data thus read, to produce target data having an error detecting code; and detecting an error in the target data having an error detecting code thus produced, by using the error detecting code.

According to a fifth aspect of the invention, a replacement part detachably installed in an image forming apparatus is provided, and the replacement part has a storage device, to which encrypted data formed by encrypting a data block containing target data to be written and an error detecting code for the data is read and written by the image forming apparatus.

In the invention, the data written in the storage device of the replacement part is encrypted data formed by encrypting a data block containing the data to be written with an error detecting code added thereto. Therefore, even in the case where the encrypted data stored in the storage device is falsified, the falsification can be detected by decrypting the data to detect an error. There is such a possibility in simple target data having an error detecting code that self-consistent falsified data can be produced by analyzing the content of the data. In the invention, however, such falsification based on data analysis is extremely difficult because the target data having an error detecting code is encrypted and written in the storage device.

BRIEF DESCRIPTION OF THE DRAWINGS

Embodiments of the present invention will be described in detail based on the following figures, wherein.

DESCRIPTION OF THE EMBODIMENTS

Embodiments of the invention will be described below with reference to the drawings.

Figure 1:
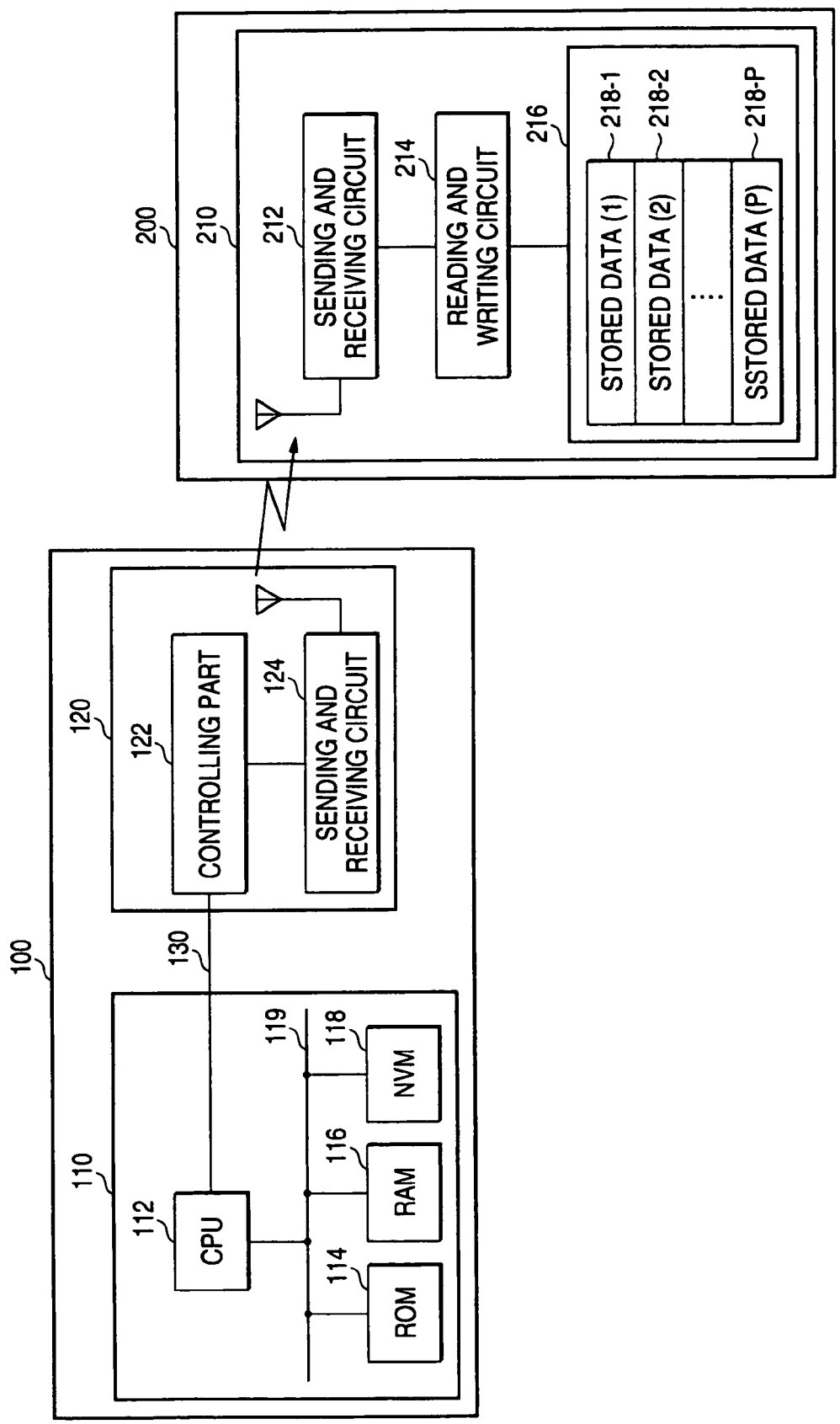
FIG. 1 is a functional block diagram showing a constitution of an important part of an image forming apparatus, to which the invention is applied.

FIG. 1 is a functional block diagram showing a constitution of an important part of an image forming apparatus, to which the invention is applied. The image forming apparatus is such an apparatus that has a mechanism for printing an image on paper, such as a printer, a duplicator, a facsimile machine and a digital duplicator. There are various kinds of printing systems including an electrophotographic system and an ink-jet system, but the invention does not depend on the printing system.

The image forming apparatus of the embodiment has an image forming apparatus main body 100 and a replacement part 200. The image forming apparatus main body 100 is a substantially fixed part of the image forming apparatus, such as chassis, and displays and buttons for user interface. The replacement part 200 can be detachably installed in the image forming apparatus main body 100 and is such a unit that is replaced upon being consumed. Examples of the replacement part 200 include a toner cartridge, a photoreceptor drum cartridge, a developing unit and a fixing unit.

The replacement part 200 has an RFID tag 210 attached thereto. The RFID tag 210 is used as a storage device for storing management data, such as the consumed amount of the replacement part 200 (such as a number of sheets printed, for which the part is used) and user information. The RFID tag 210 has a sending and receiving circuit 212, a reading and writing circuit 214 and a memory part 216. The memory part 216 is a device for storing data and is equipped with a nonvolatile storage medium. The sending and receiving circuit 212 is that for conducting wireless communication according to the standard of the RFID to a reader-writer device 120 of the image forming apparatus main body 100, and may be the same as a sending and receiving circuit of a conventional RFID tag. The reading and writing circuit 214 is that for reading and writing data to the memory part 216 and is operated according to a command received from the side of image forming apparatus main body 100 via sending and receiving circuit 212.

The memory part 216 contains a ROM (read only memory) region and an NVRAM (nonvolatile random access memory) region. The ROM region is a memory region that cannot be rewritten by a user and contains a serial ID uniquely assigned to the RFID tag 210. The NVRAM region is a nonvolatile memory region that can be rewritten and can be constituted, for example, with an EEPROM (electrically erasable programmable read only memory). The management data is stored in the NVRAM region. In this embodiment, plural data based on the same management data are written in P locations (wherein P is an integer of 2 or more) of the memory part 216 (i.e., stored data 218-1, 218-2, . . . and 218-P), whereby redundancy is ensured to improve safety level of the data.

The image forming apparatus main body 100 has a control circuit board 110 and a reader-writer device 120.

A CPU (central processing unit) 112, a ROM 114, a RAM (random access memory) 116 and an NVM (nonvolatile memory) 118 are connected to a bus 119 on the control circuit board 110. A control program for controlling the overall operation of the image forming apparatus is stored in the ROM 114. The CPU 112 executes the control program by utilizing the RAM 116 as a working memory region to control the operations of the parts of the image forming apparatus. The control program contains a program for controlling the RFID tag 210 through the reader-writer device 120. The NVM 118 is a rewritable nonvolatile memory, in which information that is necessarily recorded for controlling and managing the image forming apparatus (such as set values of various control parameters and an enumeration data of printed output sheets) is stored.

The reader-writer device 120 is a device for reading and writing data on the RFID tag 210 of the replacement part 200 through wireless communication and is disposed in the vicinity of the installation position of the replacement part 200. The reader-writer device 120 has a controlling part 122 and a sending and receiving circuit 124. The sending and receiving circuit 124 is a circuit for sending and receiving wireless signals for wireless communication to the RFID tag 210. The controlling part 122 is a circuit for controlling the sending and receiving circuit 124 to conduct sending and receiving of signals to the RFID tag 210. The controlling part 122 is connected to the CPU 112 through a communication line 130, and data is exchanged with the CPU 112 through the communication line 130. The sending and receiving circuit 124 may be the same as a sending and receiving circuit of a conventional reader-writer device.

In a conventional image forming apparatus of this type, an instruction is sent from the CPU 112 to the reader-writer device 120 to produce a command according to the instruction by the reader-writer device 120, and a CRC (cyclic redundancy check) code for communication error detection to the command, which is then sent to the RFID tag 210. In this embodiment, on the other hand, the command with a CRC code for communication error detection is produced by the CPU 112, though it is produced by the reader-writer device 120 in the conventional embodiment. In other words, the command data to be received by the RFID tag 210 from the reader-writer device 120 is produced by the CPU 112. The control program stored in the ROM 114 and the like contains such a program that produced the command data with a CRC code. At the time when the command with a CRC code sent from the CPU 112 is received by the reader-writer device 120, the reader-writer device 120 conduct CRC check on the command for investigating the presence of a communication error between the CPU 112 and the reader-writer device 120. In the case where no error is detected on the check, the reader-writer device 120 sends the command with a CRC code as it is to the RFID tag 210 with the sending and receiving circuit 124.

At the time when the reader-writer device 120 receives a response to the sent command from the RFID tag 210 (the response has a CRC code added thereto), the reader-writer device 120 conduct CRC check on the response. In the case where no error is detected on the check, the response data with a CRC code is transferred as it is to the CPU 112. The CPU 112 conducts check by using the CRC code of the response data to investigate the presence of a communication error between the reader-writer device 120 and the CPU 112.

Owing to the aforementioned constitution, error detection is carried out on the path between the CPU 112 and the reader-writer device 120, in addition to the path between the reader-writer device 120 and the RFID tag 210, on which error detection with a CRC code has been conventionally carried out. According to the constitution, furthermore, the command with a CTC code sent from the reader-writer device 120 to the RFID tag 210 is produced by the CPU 112, and thereby no circuit or program for producing a CTC code is necessary in the reader-writer device 120 to provide such an advantage that the constitution of the reader-writer device 120 can be simplified.

In this embodiment, data to be written in the memory part 216 of the RFID tag 210 is added with a CRC code and encrypted. Consequently, a result of encryption of data with a CRC code is stored in the memory part 216. The CRC code herein is added to the data separately from the CRC code added to the aforementioned command and response. While the CRC code added to the aforementioned command and response is to detect an error on the communication path, the CRC code added to the data written in the memory part 216 is to detect breakage and falsification of the data itself written in the memory part 216.

The embodiment will be described in more detail below.

Figure 2:
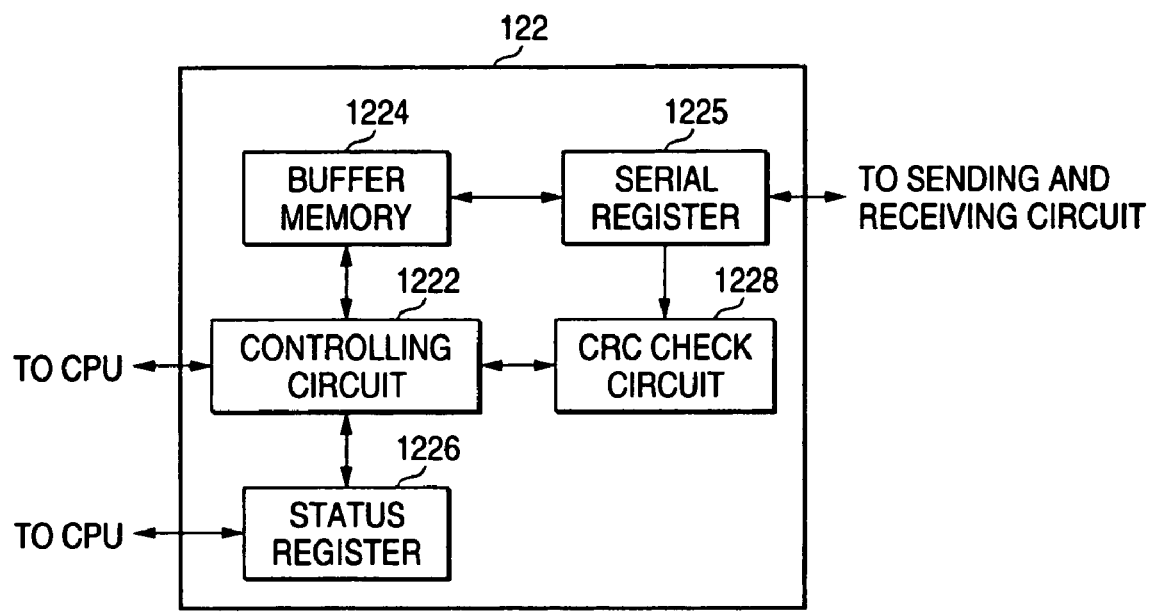
FIG. 2 is a block diagram showing an example of a hardware constitution of a controlling part of a reading and writing part.

FIG. 2 is a block diagram showing an example of a hardware constitution of the controlling part 122 of the reader-writer device 120. As shown in the figure, the controlling part 122 has a controlling circuit 1222, a buffer memory 1224, a serial register 1225, a status register 1226 and a CRC check circuit 1228.

The buffer memory 1224 is a FIFO (first in first out) type memory for temporarily retaining data received from the CPU 112 of the control circuit board 110 and data received from the RFID tag 210. The serial register 1225 is a bidirectional serial register provided for switching between the data sequence between the CPU 112 and the controlling part 122 and the data sequence between the controlling part 122 and the RFID tag 210. The CRC check circuit 1228 is a circuit for conducting CRC check for detecting the presence of a communication error on the command received from the CPU 112 and the response to the command received from the RFID tag 210. The CRC check circuit 1228 conducts CRC error check based on the data in the serial register 1225. The status register 1226 is a register, in which status information indicating the status of the reader-writer device 120 is registered. The status register 1226 is readable from the CPU 112 on the control circuit board 110. The status register 1226 has bits having been pre-assigned to the respective status items to be reported to the CPU 112. For example, it includes a bit showing as to whether or not a CRC error is detected in the command received from the CPU 112, a bit showing as to whether or not a CRC error is detected in the response received from the RFID tag 210, a bit showing such a status that the communication to the RFID tag 210 is not completed within a prescribed period of time (time-out), a bit showing such a status that the data received from the CPU 112 overflows from the buffer memory 1224, a bit showing such a status that the data received from the RFID tag 210 overflows from the buffer memory 1224, and a bit showing a busy status (for example, the CPU 112 can receive no command due to ongoing communication with the RFID tag 210). The CPU 112 can learn the status of communication among the CPU 112, the reader-writer device 120 and the RFID tag 210 by, for example, periodically reading the respective bits of the status register 1226.

The controlling circuit 1222 is that for controlling the overall operation of the controlling part 122. At the time when the controlling circuit 1222 receives data of a command from the CPU 112, the controlling circuit 1222 stores the data in the buffer memory 1224. Upon transferring the data in the buffer memory 1224 to the sending and receiving circuit 124, the data in the buffer memory 1224 is once stored in the serial register 1225, and the data is fed from the serial register 1225 to the sending and receiving circuit 124. At this time, the controlling circuit 1222 makes the CRC check circuit 1228 conduct CRC check on the data stored in the serial register 1225, and in the case where an error is detected as a result of the CRC check, the controlling circuit 1222 sets the error information to the status register 1226.

The data of the response sent from the RFID tag 210 is received by the sending and receiving circuit 124, and after converting to digital data, it is input to the serial register 1225. The response data in the serial register 1225 is stored in the buffer memory 1224 by the controlling circuit 1222. At this time, the controlling circuit 1222 makes the CRC check circuit 1228 conduct CRC check on the data stored in the serial register 1225, and in the case where an error is detected as a result of the CRC check, the controlling circuit 1222 sets the error information to the status register 1226.

In the case where the communication to the RFID tag 210 is timed out, the controlling circuit 1222 sets the time out bit in the status register 1226. As having been described, the controlling circuit 1222 registers status information to the status register 1226 based on the status of the respective parts of the controlling part 122.

The controlling part 122 having been described can be implemented in the form of, for example, an ASIC (application specific integrated circuit).

A process procedure upon writing data on the RFID tag 210 in the image forming apparatus will be described.

Figure 3:
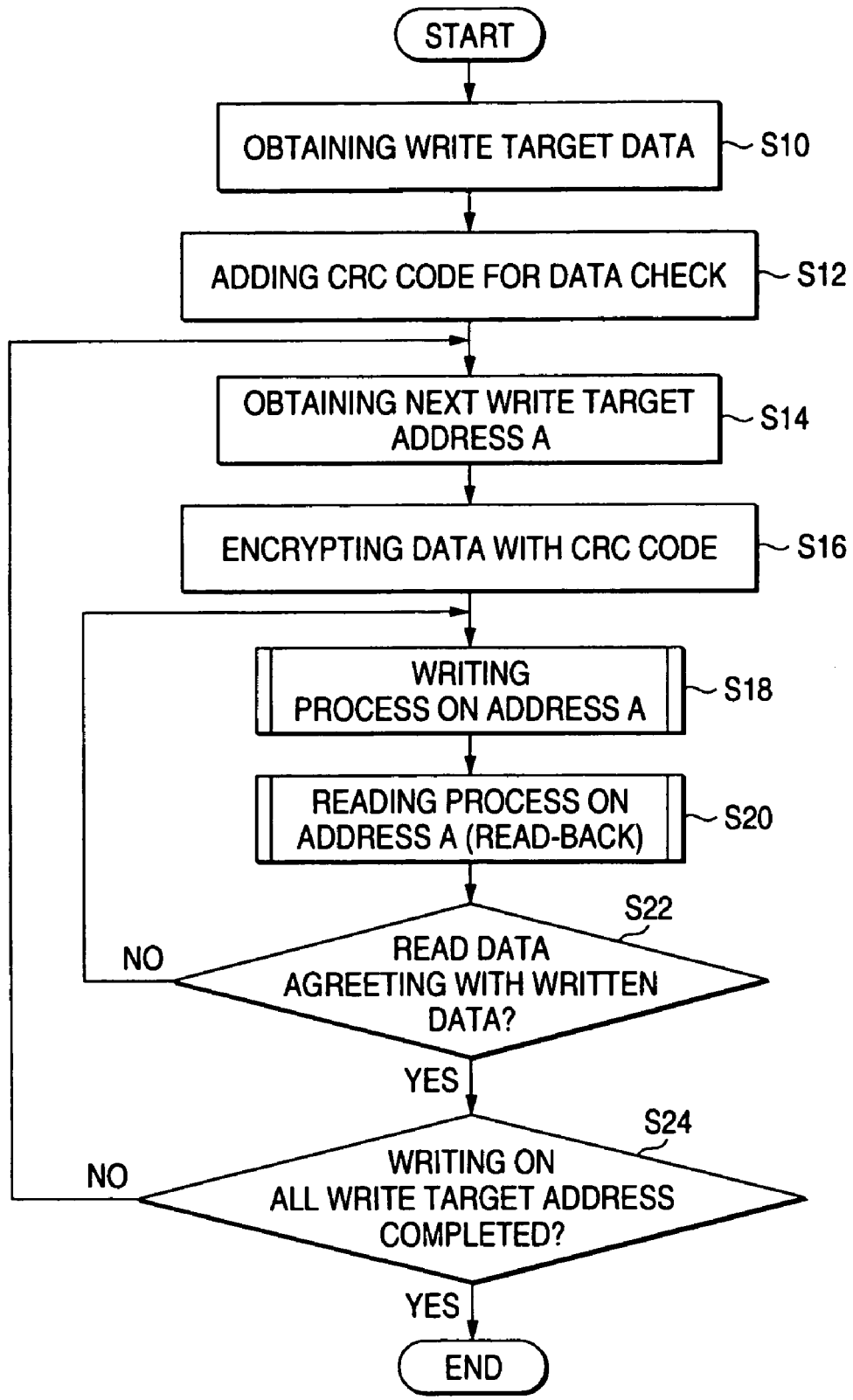
FIG. 3 is a flow chart showing a process procedure executed by a CPU upon writing data.
Figure 4:
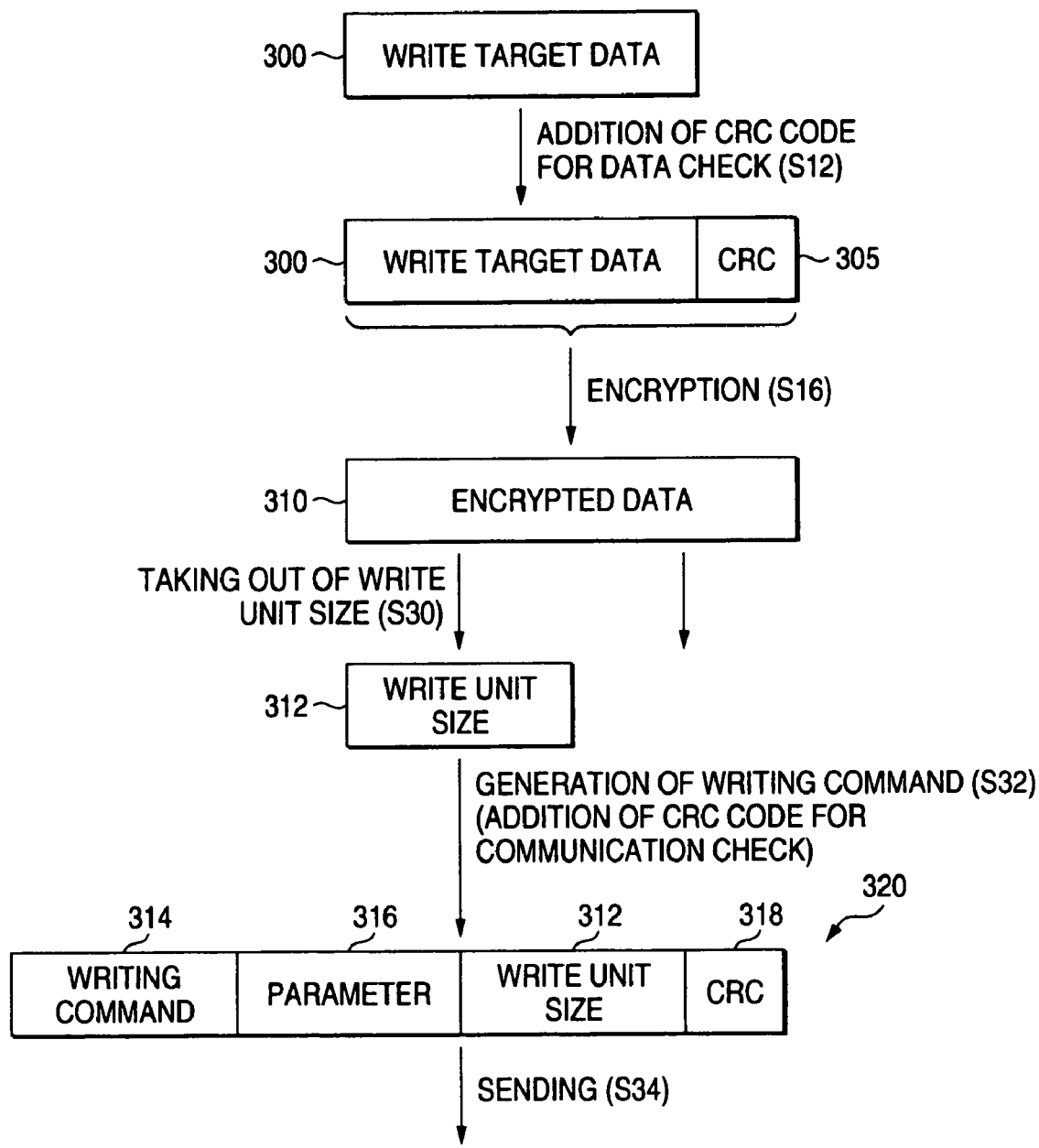
FIG. 4 is a diagram showing transition of data in a process for generating a writing command data for data writing on an RFID tag.

FIG. 3 is a flow chart showing the process procedure executed by the CPU 112 upon writing data. The process procedure herein and other process procedures of the CPU 112 described later are described in the control program retained in the ROM 114. FIG. 4 is a diagram showing transition of data in a process for generating a writing command data for data writing on the RFID tag 210.

In the data wiring process, the CPU 112 obtains data (write target data 300) to be written in the RFID tag 210 (step S10). That is, at timing of data writing, a routine corresponding to the process procedure shown in FIG. 3 is called from the main routine of the control program, and the address of the write target data 300 present on the RAM 116 or the NVM 118 is fed to the program. The write target data 300 has a prescribed size. The size is determined for an encrypting process described later and is necessary for realizing the suitable encryption strength. (As having been known in the art, the encryption strength is lowered when the data size as a unit of encryption is smaller.) The main routine calls the routine for writing process in FIG. 3 by every data of the size. In the case where the size of the data to be written is smaller than the prescribed size demanded in view of the encryption strength, write target date 300 having the prescribed size is generated, for example, by filling bits having no data with a prescribed value (for example "0"). The CPU 112 calculates a CRC code 305 corresponding to the write target data 300, and adds it to the write target data 300 (step S12). The CRC code 305 thus calculated has a prescribed size.

The CPU 112 then obtains a write target address (which is assumed to be A) in the memory part 216, in which the data is to be written (step S14).

In this embodiment, the same write target data 300 is written in P locations (P represents an integer of 2 or more) in the memory part 216. The P write target addresses for one write target data 300 and the sequence of writing on the P write target addresses are stored in the ROM 114 or the NVM 118. In the step S14, the CPU 112 obtains the write target addresses corresponding to the write target data 300 one by one from the ROM 114 or the NVM 118 according to the sequence.

The CPU 112 encrypts the write target date 300 with the CRC code 305 to generate encrypted data 310 (step S16). In an example of the embodiment upon encryption, the value of the write target address obtained in the step S14 is utilized as a parameter of the encryption process. Examples of the method of utilizing the parameter include a method of producing an encryption key used in the encryption process based on the write target address, and in the case where an algorithm of a block encryption system is used for the encryption process, a method of producing an initial vector for the encryption process from the write target address. In the case where the write target address is utilized as a parameter of the encryption process as described above, the values of encrypted data to be written in the P locations are different from each other even though they are generated from the same write target data 300. Accordingly, the encryption is difficult to be broken even though the same write target data is written in P locations. Furthermore, in the case where unique information of the RFID tag 210 is also utilized as a parameter of the encryption process in addition to the write target address, the values of the data thus written are different from each other depending on the respective RFID tags 210 even though the write target data 300 of the same value is written in the RFID tags 210, whereby the encryption strength can be further improved. Examples of the unique information of the RFID tag 210 include a serial ID uniquely assigned to the tag and a vendor code (sometimes referred to as an OEM code) indicating the vendor of the image forming apparatus. The serial ID is recorded on the ROM region of the memory part 216 of the RFID tag 210, and it is extremely difficult to modify and copy to another RFID tag. Therefore, the use of the serial ID as a parameter of the encryption process is significantly effective for preventing false procedures. The serial ID and the vendor code are read out upon installing the replacement part 200 in the image forming apparatus main body 100 or upon turning on the power of the image forming apparatus main body 100 having the replacement part 200 having been installed therein, and are stored in the RAM 116 or the NVM 118.

In the encryption process in the step S16, either algorithm of the public key system or the common key system may be used.

After completing the encryption process of the data, the CPU 112 conduct a process for writing the encrypted data 310 thus obtained on the address A in the RFID tag 210 (step S18) The writing process will be described in detail later.

After completing the writing process on the address A, the CPU 112 conduct a process for reading the data thus written from the address A in the RFID tag 210 (read back process) (step S20). The read back process is conducted for examining as to whether or not the correct data has been written on the RFID 210. The read back process will also be described in detail later.

Upon reading out the data written on the address A in the step S20, the CPU 112 compares the read out data with the encrypted data 310 having been written in the step S18 (step S22).

In the case where the two data do not agree with each other upon comparing, it is understood that the written data is not correct, and the CPU 112 returns to the step S18 to repeat the process for writing the same encrypted data 310 on the same address A.

In the case where the two data agree with each other upon comparing in the step S22, on the other hand, it is understood that the correct data has been written on the RFID 210 to succeed the writing process on the address A. In this case, the CPU 112 determines as to whether or not the writing process on all the write targets of P locations corresponding to the write target data 300 has been completed (step S24), and in the case where the process has not yet been completed, the CPU 112 returns to the step S14 and obtains the next write target address for repeating the steps S16 to S24. In the case where it is determined in the step S24 that the writing process on all the P locations has been completed, the entire writing process for the write target data 300 thus given is completed.

While the comparison of the read back data is conducted on the level of the encrypted data 310 in the aforementioned embodiment in the step S22, it is possible that the read back data is decrypted, and the determination of the correct data is carried out on the level of the raw data of the write target data 300.

Figure 5:
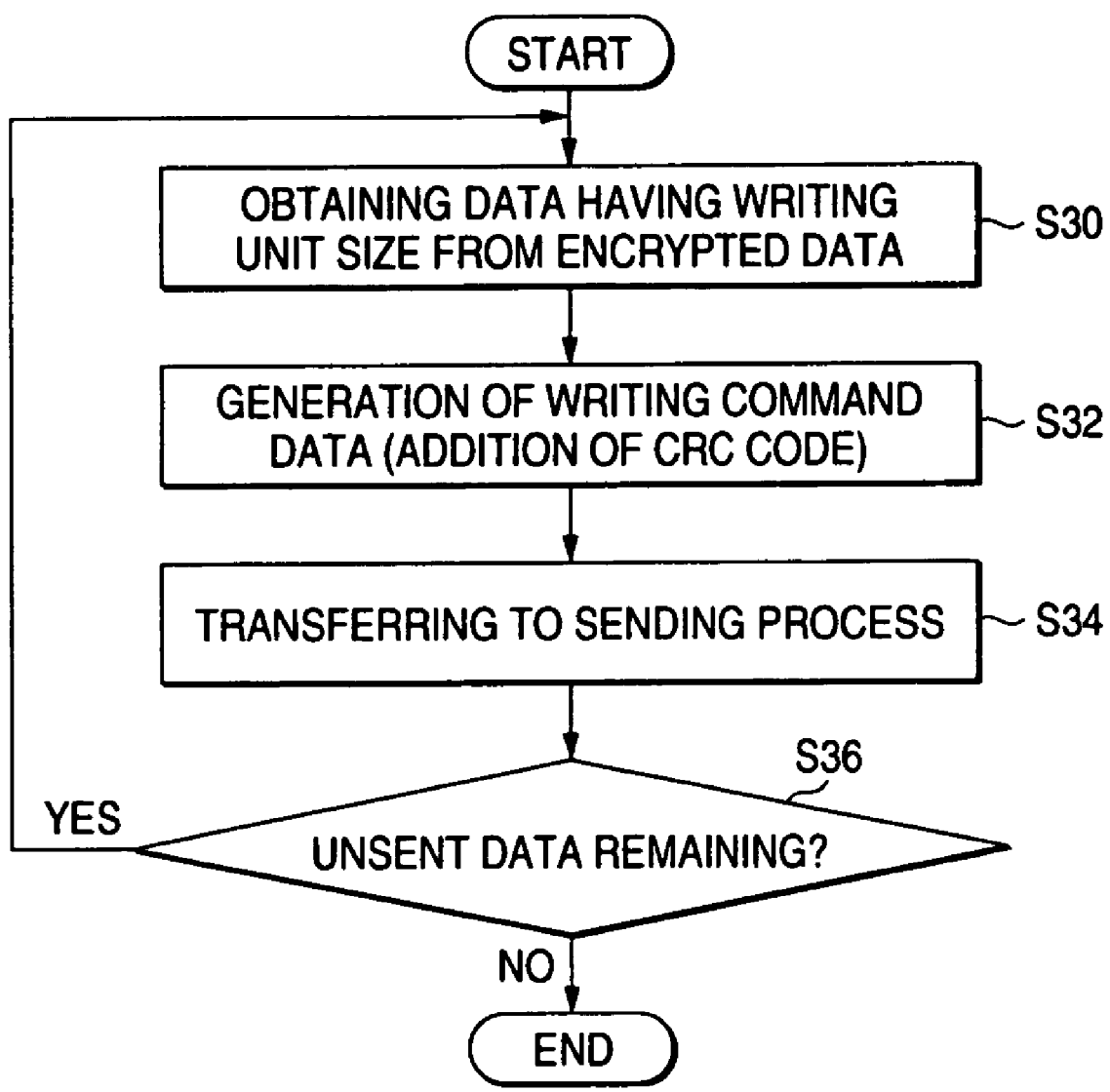
FIG. 5 is a flow chart showing a process procedure executed by a CPU for writing on one memory address of an RFID tag.

The process for writing the data on one designated address A (the step S18 in FIG. 3) will be described in detail with reference to FIG. 5. The related illustration shown in FIG. 4 will also be referred.

In this process, data 312 having a prescribed writing unit size is taken out from the encrypted data 310 generated in the step S16 (step S30). There is a limit in the size of data that can be written at one time in the RFID tag 210 through wireless communication because of such reasons as the considerably low data writing speed on an EEPROM in comparison to the processing speed of the CPU 112 and the writing speed of the RAM 116. The size of data that is written at one time through wireless communication is the aforementioned writing unit size. On the other hand, the size of the encrypted data cannot be so small in order to ensure the encryption strength, as described above. In this embodiment, consequently, encrypted data having a relatively large size is produced, and it is then written through wireless communication after dividing into plural parts. The CPU 112 takes data in each of the writing unit sizes out from the top of the encrypted data 310.

After obtaining the data 312 having the writing unit size, the CPU 112 generates writing command data 320 containing the data 312 having the writing unit size (step S32). The writing command data 320 contains a code 314 indicating "writing command" and a parameter 316 for the writing process including the write target address A and the like, and also contains the data 312 to be written having the writing unit size added at the end of the parameter 316, and a CRC code 318 with respect to all the code 314, the parameter 316 and the data 312 added at the end thereof. The command data is in accordance with the command format to the RFID tag 210 defined in ISO 14443 and ISO 15693 standards. The CRC code 318 to be added is a code having a prescribed size for detecting a communication error defined in the standards as a code added to communication data among reader-writer device RFID tags.

After producing the writing command data 320, the CPU 112 transfers the writing command data 320 to a sending process routine (step S34). The sending process (step S34) will be described in detail later with reference to FIG. 6.

After completing the sending process (step S34) of the writing command for the data having the writing unit size taken out in the step S30, the CPU 112 then determines as to whether or not the entire encrypted data 310 has been sent (step S36), and in the case where there remains unsent data, the CPU 112 returns to the step S30 to repeat the aforementioned procedure. After completing the sending process of the entire encrypted data 310, the process procedure shown in FIG. 5 is completed.

The command sending process by the CPU 112 will be described in detail with reference to FIG. 6. In this procedure, at the time when the CPU 112 receives a command data to be sent (step S40), the CPU 112 sends the data to the controlling part 122 of the reader-writer device 120 (step S42). After sending the command, the CPU 112 periodically reads the status register 1226 in the controlling part 122 of the reader-writer device 120 (step S44) to determine as to whether or not an error occurs on communication (step S46). In the case where it is determined in the step S46 that an error occurs on communication, the CPU 112 returns to the step S42, and again sends the same command data to the reader-writer device 120 and repeats the subsequent procedure. The case where it is determined that an error occurs on communication includes, for example, such a case that the bit showing the presence of a CRC error in data received from the CPU or the bit showing the presence of a CRC error in data received from the RFID tag in the status register 1226 shows a value indicating an error detected.

In the case where it is determined by checking the status register 1226 that no error occurs on communication, the CPU 112 further determines as to whether or not the reader-writer device 120 receives response data corresponding to the command data from the RFID tag 210 (step S48). In the case where the response data is correctly received from the RFID tag 210, the controlling part 122 of the reader-writer device 120 registers such a state to the status register 1226, whereby the CPU 112 can determine by reading the status register 1226 as to whether or not reception of the response data is completed. During the period where reception of the response data by the reader-writer device 120 has not yet completed in the determination in the step S48, the CPU 112 returns to the step S44 and repeats the periodical check of the status register 1226.

The response data from the RFID tag 210 is, when it is in response to the writing command data 320 for example, such data that shows as to whether or not writing on the memory part 216 is succeeded, and the like status. The response data in response to the reading command data for reading out the data stored in the memory part 216 contains the data thus read out.

At the time when completion of reception of the response data of the reader-writer device 120 is detected, the CPU 112 obtains the response data from the buffer memory 1224 of the controlling part 122 of the reader-writer device 120 (step S50). The response data thus obtained by the CPU 112 is data having the CRC code according to the standards as generated by the RFID tag 210. The CPU 112 investigates the response data by using the CRC code (step S52) to determine the presence of an error (step S54). In the case where an error occurs in the response data as a result of the determination in the step S54, the CPU 112 returns to the step S42 and again sends the same command data. It is understood that the error in this step occurs on the communication path between the controlling part 122 and the CPU 112 (because a communication error in the data from the tag 210 can be detected in the step S46), and therefore, in the case where an error is detected in the step S54, such a modified embodiment may be employed that the CPU 112 does not return to the step S42 but again read out the same response data from the buffer memory 1224. In order to implement the modified embodiment, it is necessary that the buffer memory 1224 is such a type that does not delete but can retain data after read out, and upon determining that no communication error occurs in the response data, the CPU 112 instructs deletion of the data from the buffer memory 1224 to the controlling part 122.

In the case where it is determined that no error occurs in the response data in the step S54, the CPU 112 transfer the response data to the program calling the sending process routine (step S56).

Figure 6:
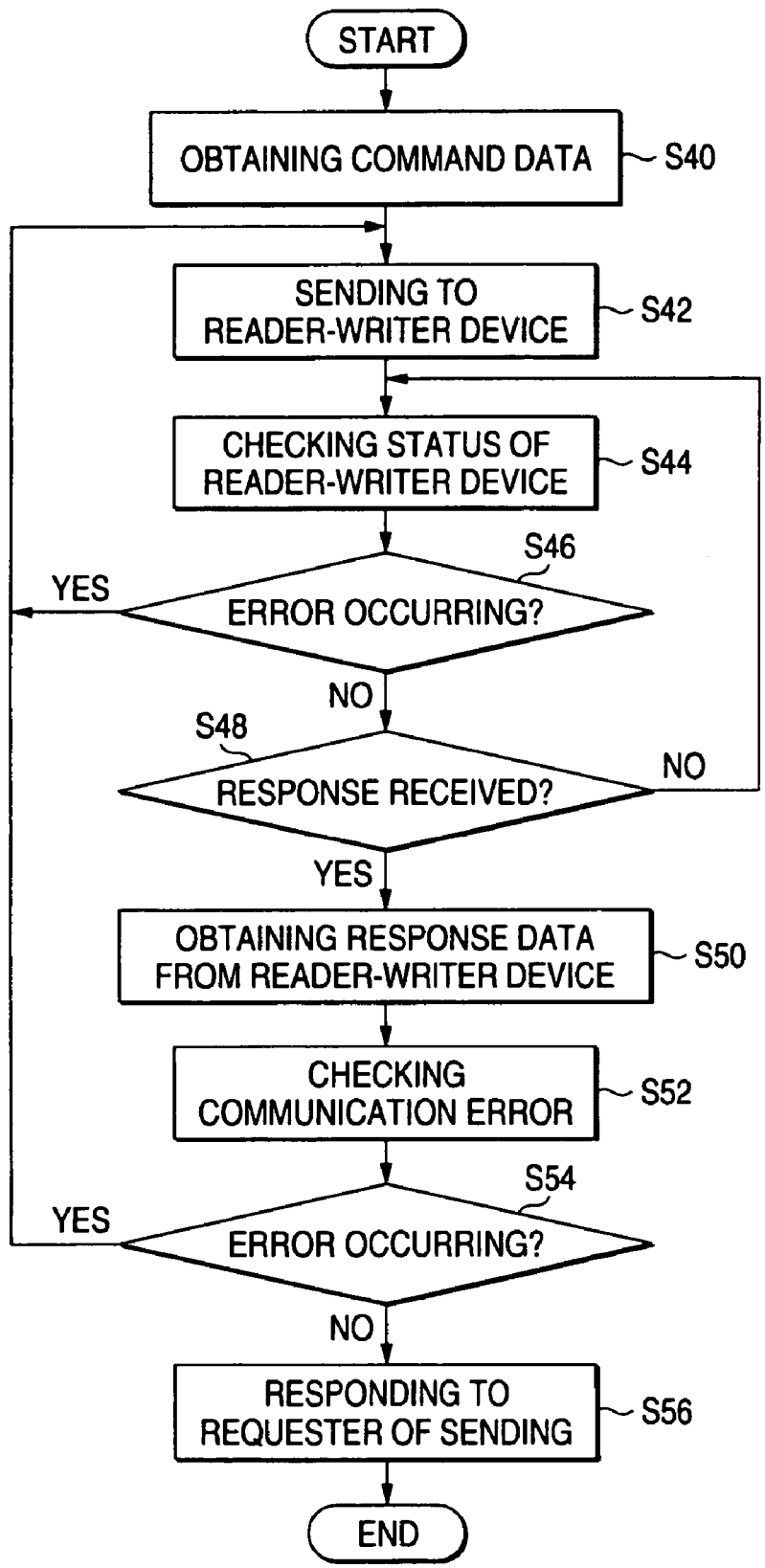
FIG. 6 is a flow chart showing a process procedure executed by a CPU upon sending one command data to an RFID tag.

According to the sending process shown in FIG. 6 having been described, resending of the command data (retry) is repeated until the command data is sent to the RFID tag 210 with no error, and the response data thereto from the RFID tag 210 reaches the CPU 112 with no error.

Figure 7:
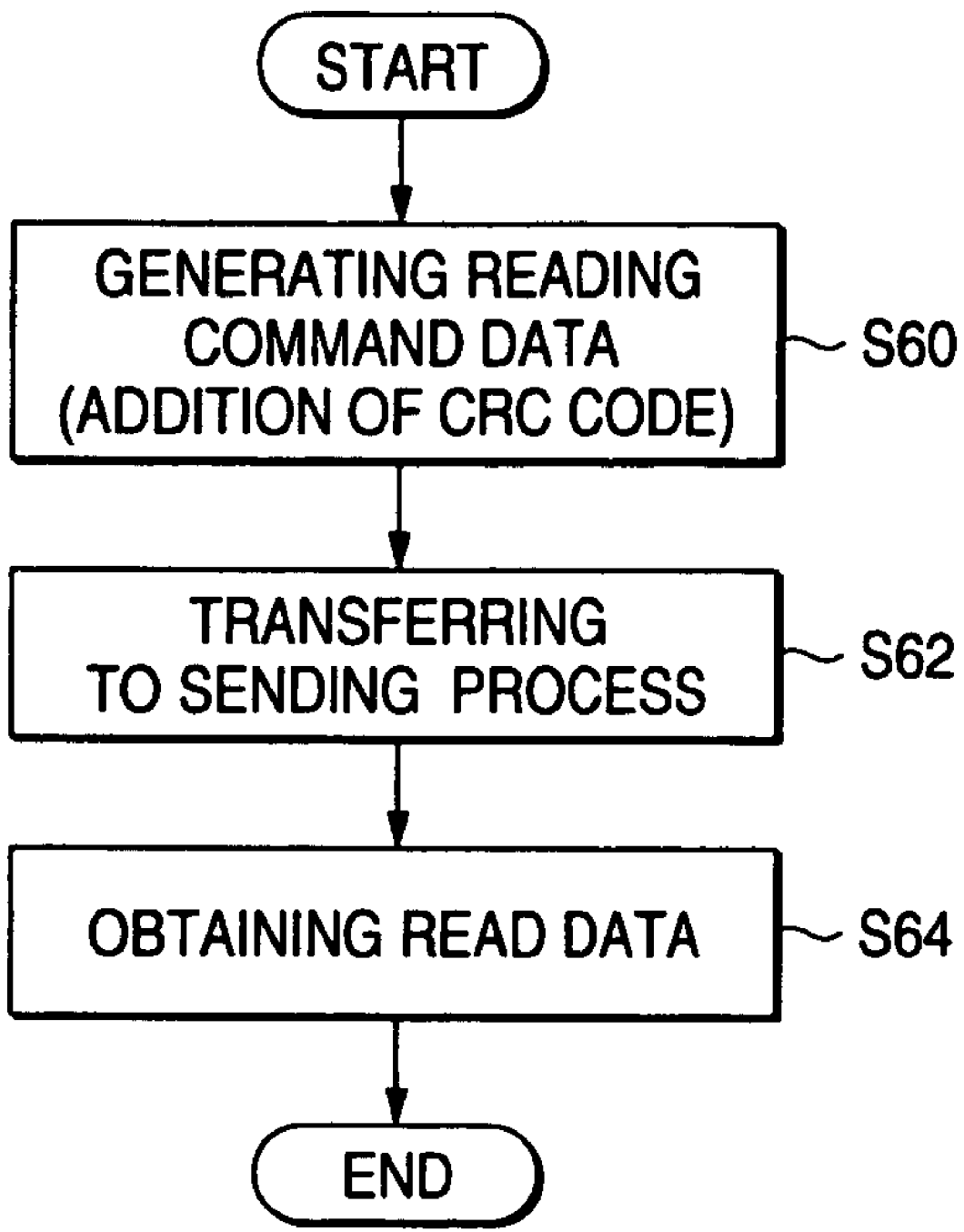
FIG. 7 is a flowchart showing a process procedure executed by a CPU for reading from one memory address of an RFID tag.

The process for reading data from one address of the memory part 216 of the RFID tag 210 (step S20 in FIG. 3) will be described in detail with reference to FIG. 7.

In this process, the CPU 112 produces reading command data (step S60). The main body of the reading command data is constituted with a code indicating "reading command" and parameters, such as the read target address and the size of the data. The size of the data that can be read out by one command thus sent is larger than that upon writing because the reading process can be conducted at a higher speed than the writing process. A CRC code is added to the main body to form the reading command data. The CPU 112 then transfers the reading command data to the sending process routine shown in FIG. 6 (step S62). After sending the reading command data to the RFID tag 210 through the sending process, data conforming to the address and the size instructed by the command is read out from the RFID tag 210, and the data is embedded in response data, which is then sent back. The sending process routine removes a header, the CRC code and the like from the response data to taken out the data thus read out from the memory part 216 (i.e., the encrypted data), which is then transferred to a reading process routine (step S64). The reading process routine transfers the data to the routine calling the reading process routine.

In the case of the read back process (step S20), the data thus read out is returned to the process routine shown in FIG. 3 for subjecting to the determination process in the step S22.

Such a process has been thus described that is for writing P pieces of the encrypted data generated from the same write target data 300 to P locations in the memory part 216 of the RFID tag 210.

A process for reading out one piece of management data from the RFID tag 210 by the CPU 112 will be described. In this embodiment as noted in the foregoing description, encrypted data generated from the same data is stored in the P locations in the memory part 216, and therefore, P pieces of data are read out in the reading process. The procedure of the reading process will be described with reference to FIG. 8.

A program calling the process designates the identification information (such as the data item name) of the data to be read out. The process routine shown in FIG. 8 receiving the designation reads out P write target addresses of the read target data and the sequence information thereof from the ROM 114 or the NVM 118 based on the identification information, and takes out the read target addresses from the P addresses one by one according to the sequence information (step S70). The addresses are then fed to the reading process routine shown in FIG. 7 to conduct the reading process (step S72). The encrypted data 310 thus read out from the memory part 216 is transferred as the read out data from the sending process routine to the process routine shown in FIG. 8. The reading process routine has been described hereinabove. In this embodiment, the reading process is repeated until data at all the P addresses in the memory part 216 has been read out (step S74).

Figure 9:
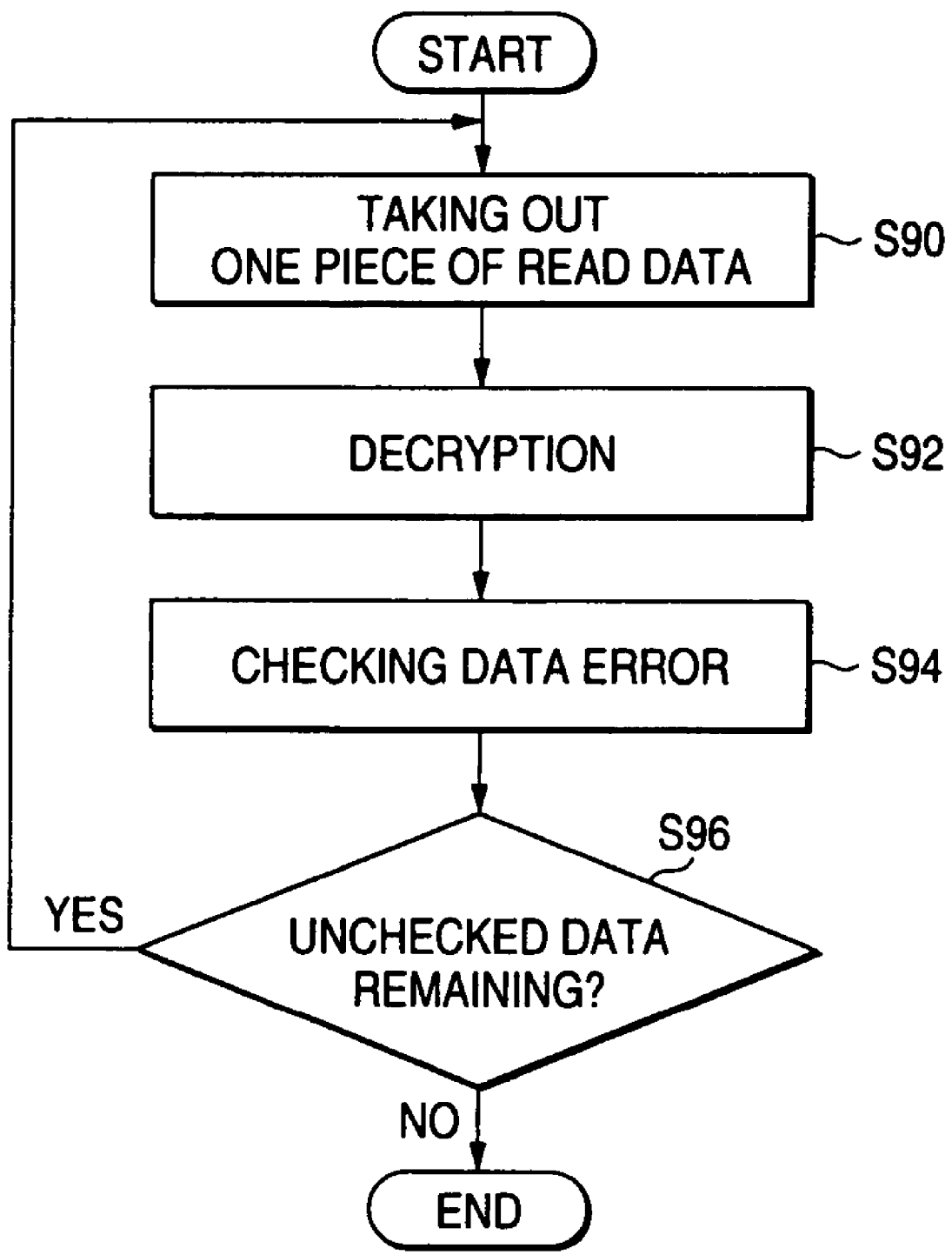
FIG. 9 is a flow chart showing a process procedure for checking read data.

After reading out data of all the P locations, the CPU 112 conduct error detection using the CRC code 305 for data check (see FIG. 4) on P pieces of read out data (step S76). FIG. 9 shows the detailed procedure of the process of the step S76. In this process, one piece of data is taken out from the P pieces of the read out data (step S90), and the read out data is decrypted (step S92). In the decryption step, a decryption process corresponding to the encryption process is carried out by using the address in the memory part 216, at which the read out data is stored, (i.e., the read target address in the step S70) as a parameter, as similar to the encryption process. In the case where the other unique data, such as the serial ID, is used as a parameter upon encryption, the parameter is used also upon decryption. As a result of the decryption process, the write target data 300 and the CRC code 305 added thereto is obtained as shown in FIG. 4. The CPU 112 conducts error detection by using the CRC code 305 obtained as a result of decryption (step S94). The aforementioned procedure is repeated for all P pieces of read out data (step S96).

After completing investigation of all P pieces of read out data (step S76), the CPU 112 determines as to whether or not abnormal data, i.e., data containing an error detected, is present in the investigation result (step S78). In the case where all the P pieces of read out data are normal, the data part obtained by removing the CRC code from the decryption result is transferred to the main routine of the control program calling the reading process, and the normal process is reverted to complete the reading process.

In the case where it is determined in the step S78 that abnormal data is present, the CPU 112 determines as to whether or not the number of piece of the abnormal data is only one among P pieces of data (step S80). In the case where it is determined that the number of piece of the abnormal data is only one, the CPU 112 restores the abnormal data by using one of (P−1) pieces of the normal data (i.e., data having no error detected) (step S82). Upon restoration, the normal data is added with a CRC code and encrypted by using the write target address of the abnormal data as a parameter, and write command data for writing the encrypted data to the write target address is produced and sent. In the case where two or more pieces of abnormal data are found, it is determined that the data stored in the RFID tag 210 suffers a fatal error, such as breakage and falsification, and a prescribed abnormal process routine is called.

The reason why restoration is carried out for only one piece of abnormal data, but occurrence of two or more pieces of abnormal data is determined as a fatal error will be described.

In this embodiment, communication error detection is carried out in all the communication paths among the CPU 112, the reader-writer device 120 and the RFID tag 210, and correctness of the data written in the RFID tag 210 is investigated by read back. In the case where an error is detected in the investigations, the writing process is retried. Therefore, it can be expected that all the data written in the RFID tag 210 is correct under the normal status. However, the rewritable non-volatile storage medium, such as an EEPROM, contained in the RFID tag 210 requires a relatively long period of time for writing, and there is such a possibility that the writing process is failed by terminating electric power during writing due to carrier abnormality between the reader-writer device 120 and the RFID tag 210. For example, in the case where the replacement part 200 is withdrawn during the writing process, the data subjected to the writing process at that time is broken. However, what is broken is only the data subjected to the writing process at that time. In this embodiment, accordingly, while one piece of write target data is written on P locations, it can be expected that even in the case where the data is broken, for example, by withdrawing the replacement part 200 under writing, the data at only one location is broken, but the data at the other (P−1) locations are correct owing to the aforementioned data writing process according to the embodiment. There is no case where data at two or more locations are simultaneously broken, for example, by withdrawing the replacement part 200 under writing. In this embodiment, under the circumstances, in the case where the number of piece of data having an error detected is only one among P pieces of data thus read out, the data having an error in the RFID 210 is restored, and the replacement part 200 is allowed to use, since there is a possibility that the data is broken by a normal operation, such as withdrawing of the replacement part 200. In the case where two or more pieces of data have an error detected among P pieces of data, it is handled as a fatal error since there is a possibility of data breakage due to expiration of the service life of the memory part 216 or physical breakage of RFID tag 210 by mechanical external force, or falsification of data by a third party. Examples of the abnormal process executed upon occurring a fatal error include such a process that a printing operation, a reading operation and the like of the image forming apparatus cannot be normally carried out unless the replacement part 200 with the fatal error is uninstalled.

The restoration carried out in the case where only one piece of abnormal data is found is preferably carried out by using newer data among the remaining (P−1) pieces of data. Because the writing sequence of the data on the P locations has been fixed as noted in the foregoing, when the order of the location where the abnormal data is present is found, it can be determined that the data of an earlier order than the abnormal data is newer than the data of the later order than the abnormal data. For example, in the case where the abnormal data is present at the second location, it is determined that the writing process at the second location is still failed after succeeding the writing process at the first location, and the data having been written in the last writing process remains at the third location and the later locations. Therefore, the second locations having an error detected may be restored by using the data read out from the first location. In the case where the abnormal data is found at the first location or the P-th location (i.e., the last location), all the data in the remaining (P−1) locations are those written by the same writing process, and therefore, any one of them can be used for restoration.

Figure 8:
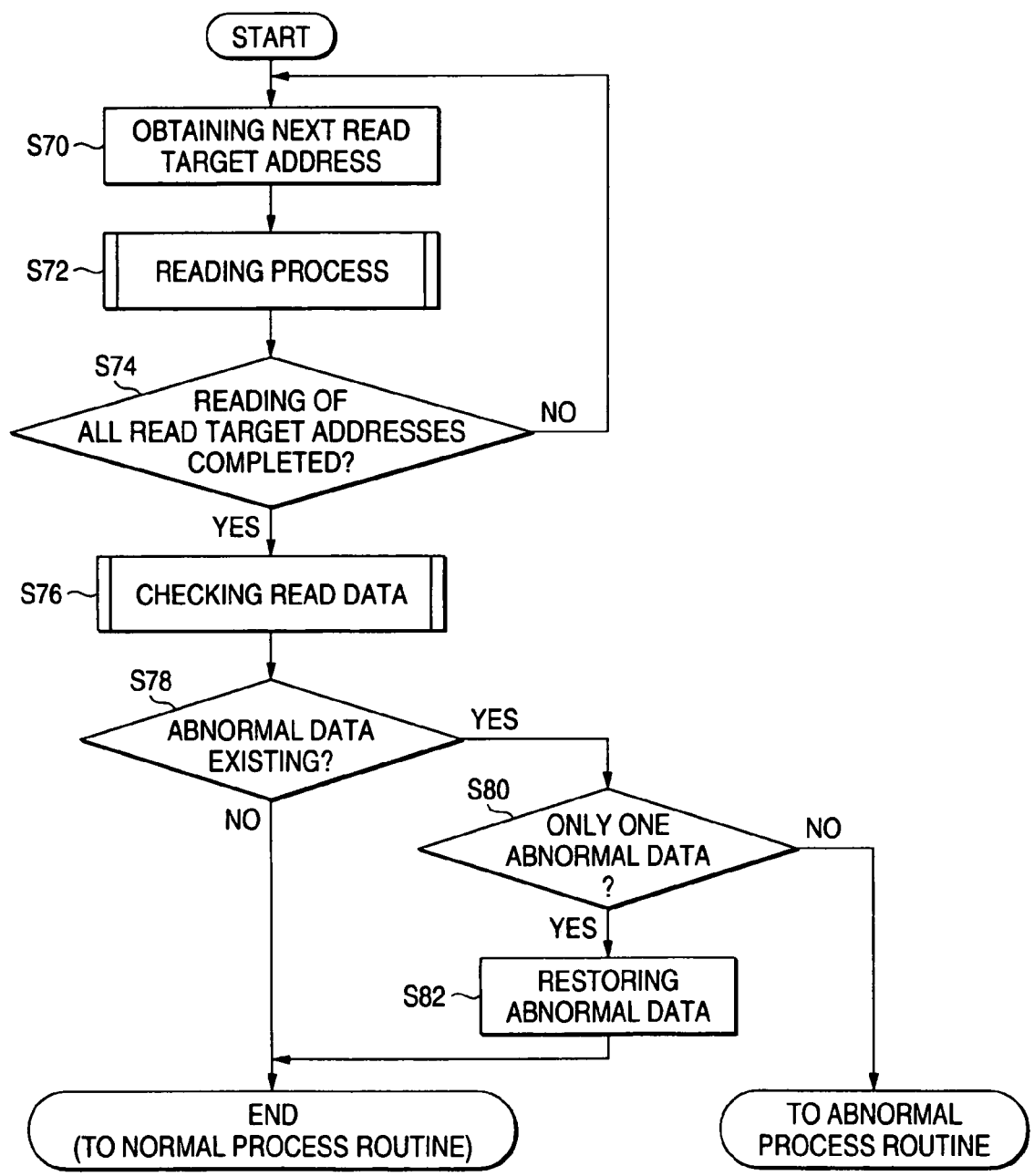
FIG. 8 is a flow chart showing a process procedure executed by a CPU upon reading data.

The reading process of the RFID tag 210 shown in FIG. 8 is carried out, for example, as a part of a memory check process executed upon turning on the power of the image forming apparatus, installing a new replacement part 200, or the like.

The processes executed by the CPU 112 have been described. The operation of the controlling part 122 of the reader-writer device 120 will be described with reference to FIG. 10.

Figure 10:
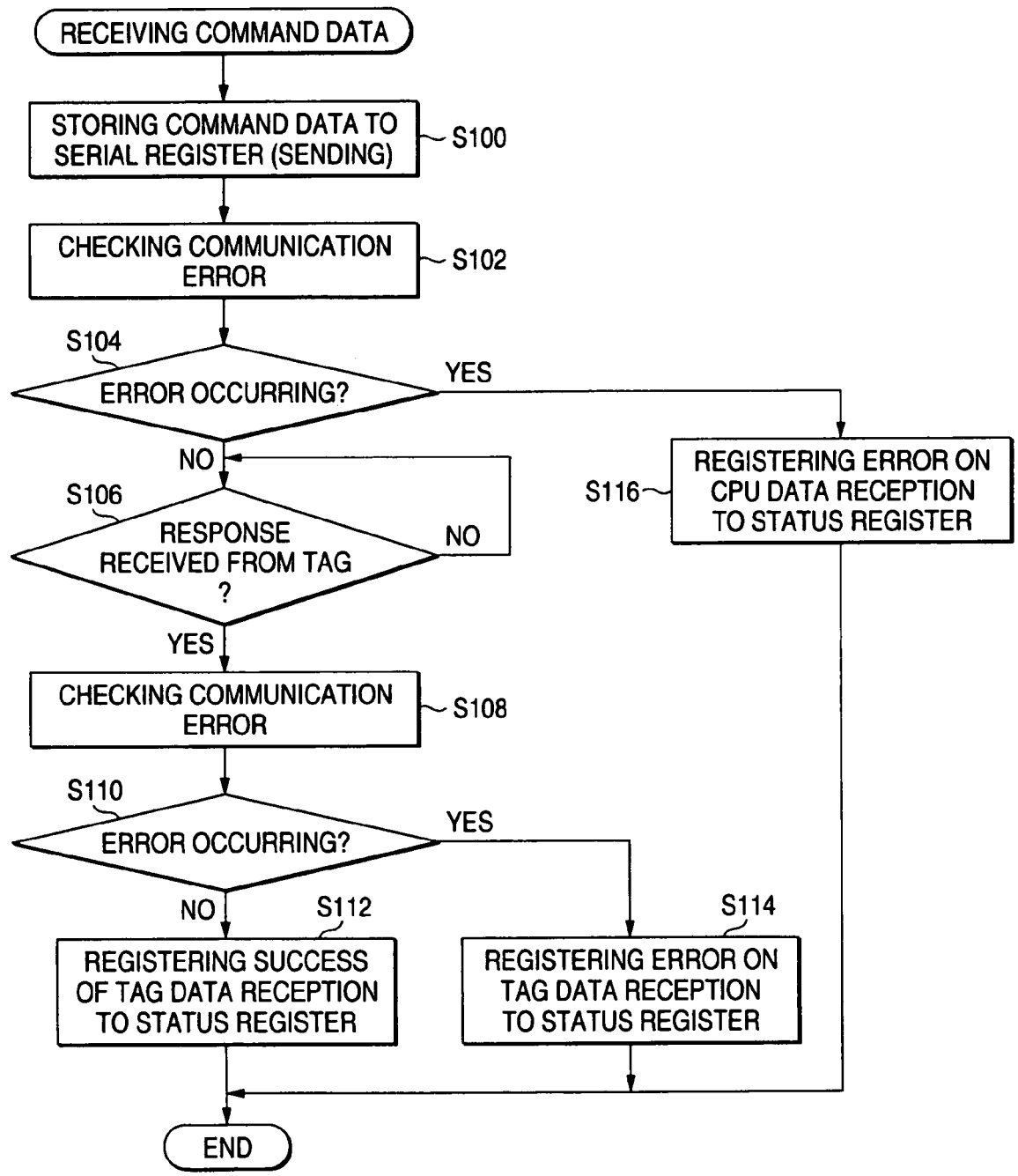
FIG. 10 is a flow chart showing a process procedure executed by a controlling part of a reader-writer device.

The reader-writer device 120 awaits arrival of the command data from the CPU 112, and upon arrival of the command data, the controlling part 122 stores the command data in the buffer memory 1224 and starts the process shown in FIG. 10. In this process, the command data (such as the writing command data 320 in FIG. 4) in the buffer memory 1224 is stored in the serial register 1225 (step S100). The data in the serial register 1225 is serially fed to the sending and receiving circuit 124 and sent to the RFID tag 210. At this time, the error detection is carried out on the command data in the serial register 1225 by the CRC check circuit 1228 using the CRC code 318 for communication error detection (steps S102 and S104). In the case where an error is detected herein, the controlling part 122 registers such information that an error is detected in the command received from the CPU 112 to the status register 1226 (step S116).

Thereafter, the controlling part 122 awaits a response to the sent command from the tag 210 (step S106). In the case where the controlling part 122 receives the response data from the tag 210 through the sending and receiving circuit 124, the response data is once stored in the serial register 1225 and then in the buffer memory 1224 therefrom. At this time, the controlling part 122 conducts error detection on the response data in the serial register 1225 by the CRC check circuit 1228, and receives a result of the check (steps S108 and S110). In the error detection, the CRC code for detecting a communication error contained in the response data. In the case where no error is detected upon error detection, the controlling part 122 registers such information that reception of the response data from the tag 210 is succeeded to the status register 1226 (step S112). At the time when the CPU 112 monitoring the status register 1226 detects that reception of the response data is succeeded by the controlling part 122, it obtains the response data from the buffer memory 1224. In the case where an error is detected in the error detection, on the other hand, the controlling part 122 registers such information that an error is found in the data received from the tag 210 to the status register 1226 (step S114). The CPU 112 monitoring the status register 1226 then executes a prescribed recovery process, such as retry of sending the command, based on the information.

As having been known in the art, in the case where the RFID tag 210 conducts CRC check on the data received from the reader-writer device 120 and detects an error, the RFID tag 210 produces such response data that an error is detected (to which a CRC code for detecting a communication error is added) and sends it to the reader-writer device 120. The reader-writer device 210 stores the response data in the buffer memory 1224 and simultaneously conducts communication error detection on the response data. In the case where no error is detected herein, information indicating success of reception of the response is registered to the status register 1226, and according thereto, the CPU 112 reads out the response data from the buffer memory 1224 (at this time, the CRC code for detecting a communication error is removed from the response data). Consequently, the CPU 112 recognizes that a communication error is detected upon receiving by the RFID tag 210 and conducts a necessary procedure, such as retry.

An embodiment of the invention has been described. In the aforementioned description, while the processes of the CPU 112 and the reader-writer device 120 have been described in detail, detailed descriptions of the process executed by the RFID 210 have been omitted since it may be the same as the conventional technique.

In the aforementioned description, the case where data is written in and read out with respect to the RFID tag 210 is mainly described. In this embodiment, other commands to the RFID tag 210 and responses to the commands are subjected to error detection and recovery based thereon among the CPU 112, the reader-writer device 120 and the RFID tag 210 in the same manner as in the aforementioned write-in and readout of the data.

The embodiment having been described herein is for mere exemplification, and various modifications can be made therein within the scope of the invention. For example, while a CRC code is used as an error detection code in the aforementioned embodiment, other codes may be used therefor.

Furthermore, embodiments of the invention will be described below.

(1) An image forming apparatus according to the first aspect, wherein the writing part further has a write controlling part writing the encrypted data corresponding to the same target data to plural storage regions corresponding to the target data.

(2) An image forming apparatus according to the aforementioned item (1), wherein upon generating the encrypted data to be written in the storage regions by the encrypting part, the write controlling part makes the encrypting part execute encryption by using encryption methods corresponding to the storage regions, respectively.

(3) An image forming apparatus according to the second aspect, wherein the image forming apparatus further has: a read controlling part making the reading part read out the encrypted data from plural storage regions corresponding to the target data, making the decrypting part decrypt plural pieces of encrypted data thus read out, and making the error detecting part detect an error in the plural pieces of data thus decrypted; a restoration processing part, in a case where an error is detected by the error detecting part in only one of the plural pieces of decrypted data, restoring the storage region storing encrypted data corresponding to the data having an error thus detected by writing therein encrypted data produced based on the data having no error detected; and an error processing part, in a case where an error is detected by the error detecting part in two or more of the plural pieces of decrypted data, executing a prescribed error process.

(4) An image forming apparatus according to the aforementioned item (3), wherein the read controlling part makes the decrypting part execute decryption of the plural pieces of decrypted data thus read out, by using decryption methods corresponding to the storage regions storing the decrypted data, respectively.

The entire disclosure of Japanese Patent Application No. 2003-389741 filed on Nov. 19, 2003 including specification, claims, drawings and abstract is incorporated herein by reference in its entirety.

What is claimed is:

1. An image forming apparatus configured to have a replacement part equipped with a storage device, the apparatus comprising:
   a code part that adds an error detecting code to a target data set to be written in the storage device;
   an encrypting part that receives a plurality of addresses in which the target data set is to be written and encrypts a single target data set having the error detecting code, by using the plurality of addresses as parameters of the encryption to generate a plurality of encrypted data sets, each of the encrypted data sets having different values and being encrypted using one of the plurality of addresses; and
   a writing part that writes each of the encrypted data sets to a corresponding address in the storage device.

2. The image forming apparatus according to claim 1, further comprising:
   a reading part that reads the plurality of encrypted data sets stored in the storage device;
   a decrypting part that decrypts, by using the corresponding address, the plurality of encrypted data sets read by the reading part, to generate a plurality of decrypted data sets having the error detecting code; and
   an error detecting part that detects an error in the plurality of decrypted target data sets by using the error detecting code.

3. An image forming apparatus according to claim 2, wherein the image forming apparatus further comprises:
   a restoration processing part, in a case where an error is detected by the error detecting part in only one of the plurality of decrypted data sets, that restores an encrypted data set corresponding to the one of the plurality of decrypted data sets based on the decrypted data set having no error detected; and
   an error processing part, in a case where an error is detected by the error detecting part in two or more of the plurality of decrypted data sets, executing a prescribed error process without restoring the encrypted data having error detected.

4. In an image forming apparatus configured to have a replacement part equipped with a storage device, a method for controlling writing data from the image forming apparatus to the storage device, the method comprising steps of:
   adding an error detecting code to a target data set to be written in the storage device;
   receiving a plurality of addresses in which the target data set is to be written;
   encrypting a single target data set having the error detecting code by using the plurality of addresses as parameters of the encryption to generate a plurality of encrypted data sets, each of the encrypted data sets having different values and being encrypted using one of the plurality of addresses; and
   writing each of the encrypted data sets to a corresponding address in the storage device.

5. The method according to claim 4, further comprising steps of:
   reading the plurality of encrypted data sets stored in the storage device;
   decrypting, by using the corresponding address, the plurality of encrypted data sets read, to generate a plurality of decrypted data sets having the error detecting code; and
   detecting an error in the plurality of decrypted target data sets by using the error detecting code.

6. The image forming apparatus according to claim 1, wherein
   the replacement part is at least one of the toner cartridge, a photoreceptor drum cartridge, a development unit and a fusing unit.

7. The image forming apparatus according to claim 1, wherein
   the single target data set includes at least one of data representing a consumed amount of the replacement part and data representing user information of the image forming apparatus.

8. An image forming apparatus, which has a printing function, configured to have a replacement part equipped with a storage device, the replacement part being at lest one of a toner cartridge, a photoreceptor drum cartridge, a development unit and a fusing unit, the apparatus comprising:
   a code adding part that adds an error detecting code to a target data set to be written in the storage device, the target data set includes data representing a consumed amount of the replacement part;
   an encrypting part that receives a plurality of addresses in which the target data set is to be written and encrypts a single target data set having the error detecting code by using the plurality of addresses as parameters of the encryption to generate a plurality of encrypted data sets, each of the encrypted data sets having different values and being encrypted using one of the plurality of addresses;
   a writing part that writes each of the encrypted data sets to a corresponding address in the storage device;
   a reading part that reads the plurality of encrypted data sets stored in the storage device;
   a decrypting part that decrypts, by using the corresponding address, the plurality of encrypted data sets read by the reading part, to generate a plurality of decrypted data sets having the error detecting code; and
   an error detecting part that detects an error in the plurality of the decrypted target data sets by using the error detecting code.

* * * * *